United States Patent

Willison

[11] Patent Number: 5,170,881
[45] Date of Patent: Dec. 15, 1992

[54] PIN OVEN STRIPPER

[75] Inventor: Beverly G. Willison, Fairlawn, Ohio

[73] Assignee: FECO Engineered Systems, Inc., Cleveland, Ohio

[21] Appl. No.: 478,134

[22] Filed: Feb. 9, 1990

Related U.S. Application Data

[63] Continuation of Ser. No. 283,969, Dec. 13, 1988, abandoned.

[51] Int. Cl.$^5$ ............................................... B65G 17/46
[52] U.S. Cl. .................................... 198/689.1; 198/841
[58] Field of Search ..................... 198/689.1, 841, 810, 198/804

[56] References Cited

U.S. PATENT DOCUMENTS

| | | | |
|---|---|---|---|
| 3,712,455 | 1/1973 | Anfossi et al. | 198/689.1 X |
| 4,304,508 | 12/1981 | Wolf | 198/689.1 X |
| 4,406,359 | 9/1983 | Cole et al. | 198/689.1 X |
| 4,662,085 | 5/1987 | Russo et al. | 34/105 |

FOREIGN PATENT DOCUMENTS

| | | | |
|---|---|---|---|
| 2805271 | 8/1979 | Fed. Rep. of Germany | 198/689.1 |
| 3626244 | 2/1988 | Fed. Rep. of Germany | 198/689.1 |

OTHER PUBLICATIONS

Rexnord Engineering Manual Re TableTop Chains pp. 1-13, 58, 72-79, 89-96, 127-129, 137 and 138, 1985.

Primary Examiner—Robert P. Olszewski
Assistant Examiner—James R. Bidwell
Attorney, Agent, or Firm—Renner, Otto, Boisselle & Sklar

[57] ABSTRACT

A pin oven stripper for removing can bodies having bases from a moving pin conveyor at a vertical inclined flight of the pin conveyor. The stripper comprises a drive sprocket, an idler wheel and a vacuum conveyor chain composed of plastic links. The chain is trained around the drive sprocket and idler. A carrying way guides the vacuum chain from the idler to the drive sprocket first along a vertical inclined flight parallel to the path of the pin conveyor in close proximity to the bases of the can bodies, then along a vertical flight for effecting removal of cans from the pin conveyor, the can bodies being removably secured to the chain by suction supplied through apertures in the links, and then along a curved flight extending to a horizontal flight terminating at the drive sprocket. The chain further has as a characterizing feature thereof a substantially free hanging return flight extending from the drive sprocket to the idler, which enables high speed operation at speeds in excess of 1500 cans per minute.

16 Claims, 3 Drawing Sheets

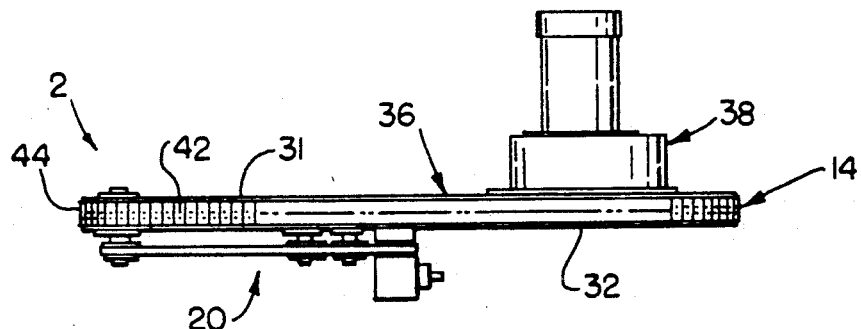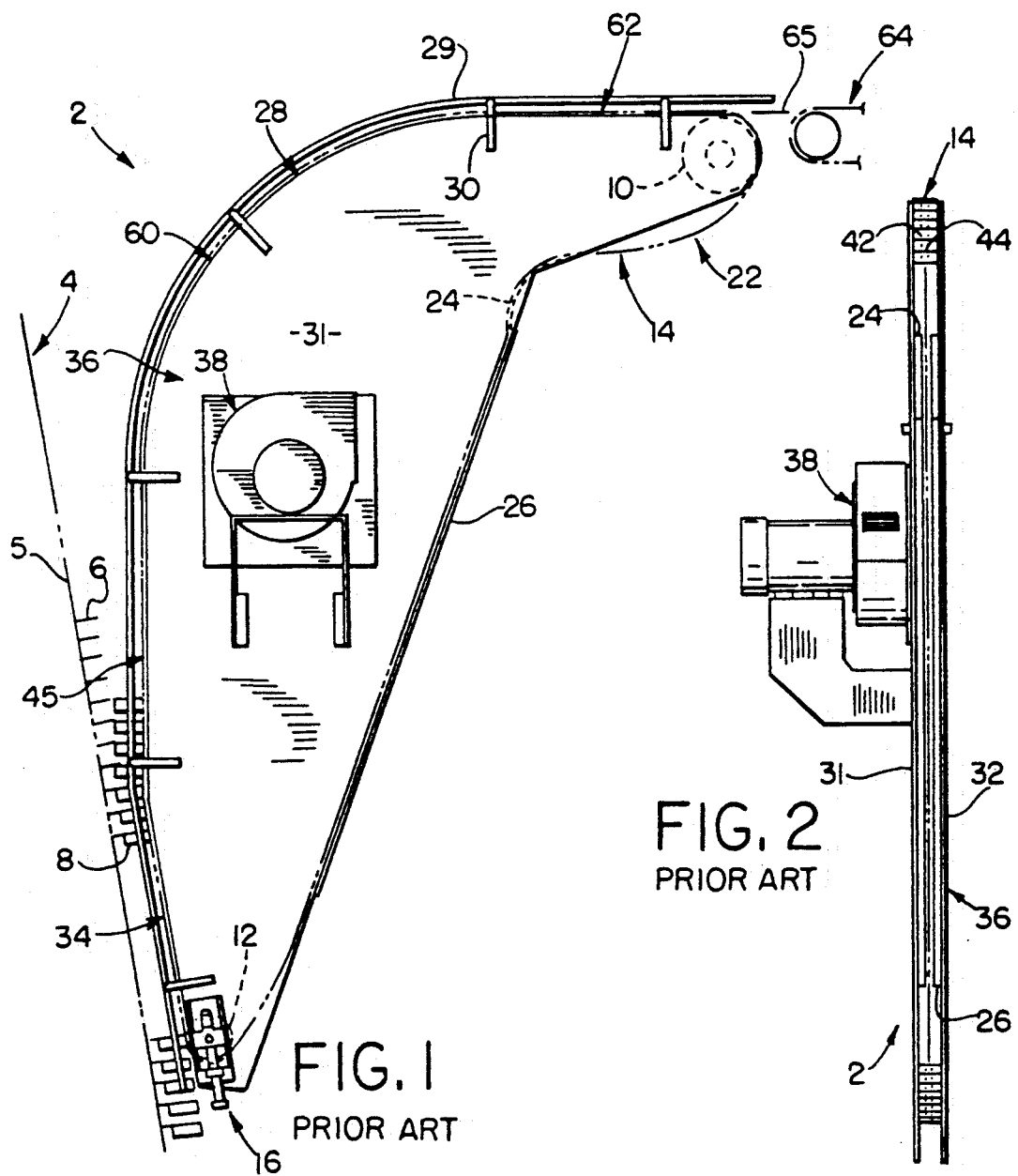
FIG. 3 PRIOR ART
FIG. 2 PRIOR ART
FIG. 1 PRIOR ART

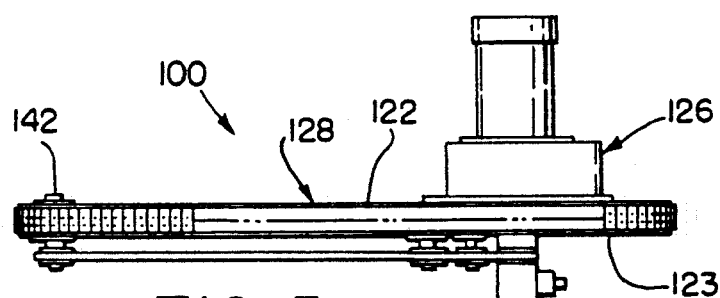
FIG. 5
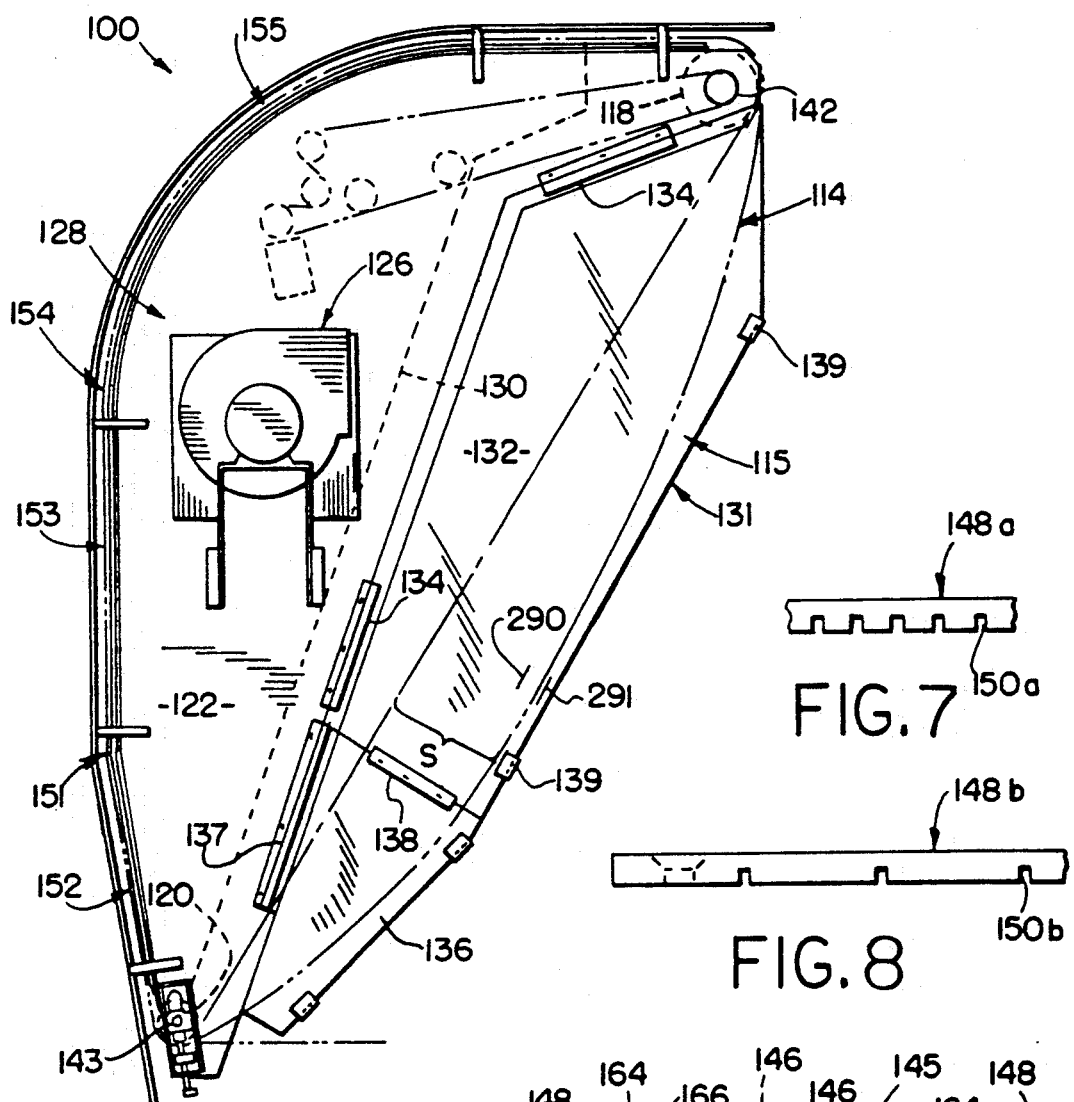
FIG. 4
FIG. 7
FIG. 8
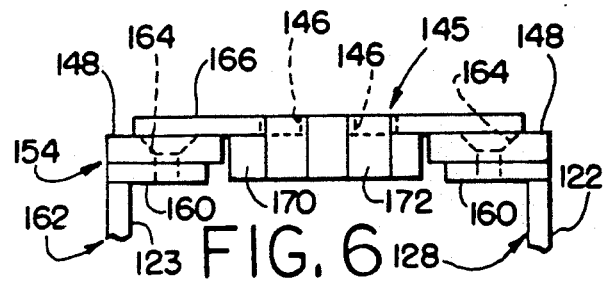
FIG. 6

PIN OVEN STRIPPER

This is a continuation Ser. No. 07/283,969 filed on Dec. 13, 1988, now abandoned.

DISCLOSURE

This invention relates generally to strippers for pin ovens or the like. Such strippers are operable to remove articles such as can or container bodies from a pin conveyor for transfer to a take-away device such as a mass conveyor. More particularly, the invention relates to a high speed pin oven stripper capable of operating at speeds above 1500 cans per minute.

BACKGROUND OF THE INVENTION

Metal cans for containing beer and beverage products as well as a wide variety of other consumables are in widespread use. Generally the cans are comprised of one open ended piece that forms the can body and a second piece which is utilized for sealing the can. Aluminum and steel are materials of choice for the fabrication of many of these cans. The outer surfaces of the cans are typically supplied with a label or other printing which is then overvarnished to protect the printing as well as the surface of the can. In addition, an interior coating is sometimes applied to the can in order to protect against product contamination.

After application of the printing and other coatings to the can surfaces it is necessary to properly cure the cans by baking. After baking, the cans are then cooled prior to being utilized. To effect proper curing of the various can coatings the cans are carried through a pin oven on a pin conveyor which is essentially an endless conveyor having a multiplicity of pins over which the can bodies are placed for travel through the curing oven and cooler.

In modern pin oven operations cans can typically move through the oven at speeds of up to 1500 cans per minute. One of the limiting factors as to the number of cans that can be moved through an oven is the speed with which the cans can be removed from the pins on which they are carried after the cans emerge from the cooler attached to the oven.

In the past, for further processing, the cans have been removed from the pin conveyor by an apparatus which is referred to in the art as a pin stripper or, more simply, a stripper. A common type of stripper employs a moving vacuum chain to which the bottoms of the can bodies may be drawn to effect removal of the cans from the pin conveyor. The vacuum chain is made of plastic and is run in a dry condition along wear strips. Such type of stripper has been successfully run with desirable vacuum chain performance at vacuum chain speeds up to about 650 feet per minute, i.e., at can removal speeds up to about 1500 cans per minute given a typical conveyor pin spacing of 5.25 inch. At higher speeds, excessive wear of the vacuum chain links and to a lesser extent the wear strips has been encountered, and the heat and dynamic forces involved may even cause the chain link plastic to flow or melt. An impetus to keeping wear at a minimum is not only the cost factor involved in replacing worn chain links and/or wear strips, but also the substantial down time required to replace worn links and/or wear strips. It would be most desirable to be able to increase stripper speed and can removal rate while at the same time maintaining the integrity of the pin stripper chain and wear strips in order not only to improve and increase can production capability, but also to reduce and minimize maintenance and down time.

SUMMARY OF THE INVENTION

This invention provides a new and substantially improved design for a stripper for pin oven conveyors or the like. The new design facilitates operation of the conveyor chain at speeds enabling can removal in excess of 1500 cans per minute and as high as 2000 cans per minute or possibly higher, which speeds heretofore were unachievable without experiencing unacceptable chain wear or damage and the resultant downtime needed to replace worn chains and/or wear strips. The stripper of this invention is characterized by a free hanging return flight extending from proximate a drive sprocket to proximate an idler sprocket at the beginning end of a carrying way.

According to a preferred embodiment of the invention, a stripper for removing can bodies having bases from a moving pin conveyor comprises a drive sprocket, an idler, a plastic conveyor chain trained around the drive sprocket and idler, the chain having associated therewith means for causing the bases of can bodies to be held to the chain when in close proximity with respect to one another, means for rotatably driving the drive sprocket to drive the chain, and means for guiding the chain along a carrying path from the idler to the drive sprocket, the carrying path having a first flight adapted to be disposed parallel to the path of the pin conveyor in close proximity to the bases of the can bodies, a second flight inclined to the first flight for effecting removal of the can bodies from the pin conveyor, a curved flight extending to a further flight terminating at the drive sprocket, and the conveyor chain having a substantially free hanging return flight extending from proximate the drive sprocket to proximate the idler. The means for causing preferably includes a vacuum acting through the conveyor chain to releasably hold the can bodies to the chain.

More particularly, the stripper comprises a sprocket which is driven by a motor or other suitable prime mover for imparting motion to a vacuum chain or belt which is trained over the sprocket. The stripper further has an idler wheel which is positioned below the drive sprocket and around which the vacuum chain is guided to the beginning of the carrying way. Along the can carrying way, guides are provided for the conveyor chain to assist in maintaining can alignment. The carrying way extends in a generally vertical direction from the idler sprocket and runs in a direction substantially parallel to a moving pin oven conveyor on which cans that have been heated, cured and cooled are being transported. The carrying way diverges from its parallelism with the pin oven conveyor and then traverses a gentle curve which ends at a horizontal flight terminating at the drive sprocket.

Cans are sucked onto the stripper chain through the use of a vacuum supplied via a vacuum chamber by an appropriate vacuum source. The vacuum chamber underlies the carrying way and in combination with the aforementioned divergent path removes the cans from the pins of the pin oven conveyor and holds them to the stripper vacuum chain. The cans are then appropriately distributed to further conveyor mechanisms and the chain of the stripper is pulled over and around the drive sprocket.

At this point in the chain travel the chain enters the return flight extending from the driving sprocket to the idler wheel. Between the drive sprocket and the idler wheel the chain is substantially free hanging and slack. The chain tension or sag is adjusted, as by varying the number of chain links utilized in forming the chain, such that a gentle loop is formed between the drive sprocket and the idler wheel.

By reason of this improved design, can removal speeds in excess of 1500 cans per minute are economically attainable.

The invention utilizes lubricant impregnated wood wear strips along the carrying way as well as high molecular weight plastics for the chain links.

The foregoing and other features of the invention are hereinafter fully described and particularly pointed out in the claims. The following description and the annexed drawings set forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a side view of a prior art pin oven stripper juxtaposed to a moving pin conveyor;

FIG. 2 is a back view of the prior art stripper shown in FIG. 1;

FIG. 3 is a top view of the stripper shown in FIGS. 1 and 2;

FIG. 4 is a side view of a pin oven stripper according to the present invention;

FIG. 5 is a top view of the stripper of FIG. 4;

FIG. 6 is an end view of a chain link riding atop a wear strip in the carrying way;

FIG. 7 is fragmentary side view of the wear strip employed at the lower portions of the carrying way;

FIG. 8 is a fragmentary side view of the wear strip employed in the more curved and upper portions of the carrying way.

DETAILED DESCRIPTION

Figure 9:
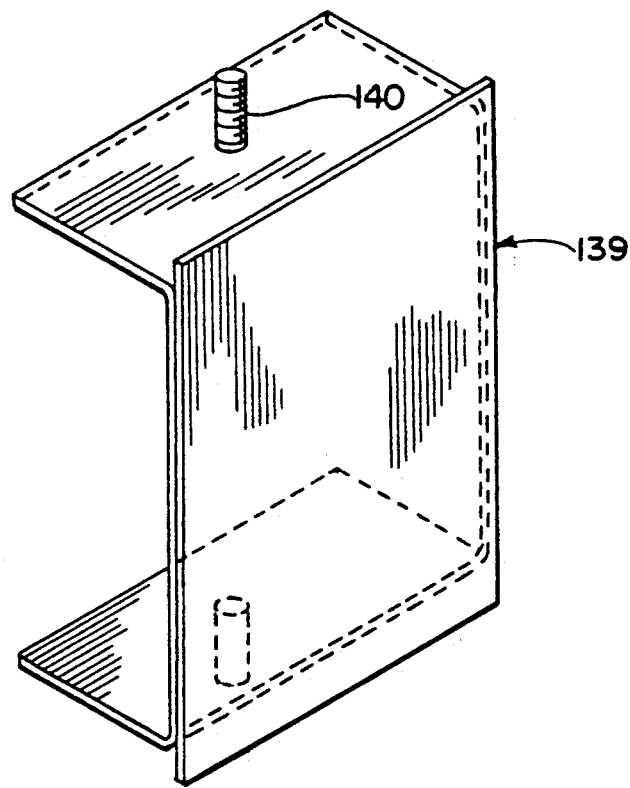
FIG. 9 is a perspective view of a bracket employed in the invention to stabilize the sides of the cover plates.

Referring first to FIGS. 1-3 there is illustrated a stripper 2 which is part of the prior art. The stripper 2 is oriented in juxtaposition to a moving pin conveyor 4 which includes a conveyor chain 5 and can carrying pins 6. The pins 6 of the conveyor are slightly inclined to assist in retaining cans 8 on the pins as they are carried through a pin oven which is not shown.

The pin oven stripper 2 is comprised of a driven conveyor drive sprocket 10 and an idler sprocket or wheel 12. Trained around these two sprockets is a vacuum conveyor belt or chain 14 composed of articulated links. The chain may be adjusted for both tension and tracking by a chain take-up device shown generally at 16. Chain tension may also be adjusted by adding or removing links from the chain. The drive sprocket 10 is driven through a suitable timing or drive chain mechanism 20.

In FIG. 1 the vacuum chain 14 follows a clockwise path, the chain forming a catenary in the area indicated illustratively at 22. The chain is taken up over a curved guide 24 at the beginning of return way 26. The return way 26 is provided with return wear strips on which the vacuum chain slides from curved guide 24 to a location spaced a relatively short distance from the idler wheel 12.

The vacuum chain 14, upon emergence from the return way 26, is trained about the idler 12 at the beginning of a carrying way 28 which defines a carrying path for the vacuum chain. The carrying way, in the manner illustrated below in connection with a preferred embodiment of the invention, is provided with laterally spaced apart wear strips on which the chain links slide. Along the carrying way there are provided guide rails 29 secured by rail supports 30 to stripper side walls 31 and 32.

A first inclined vertical portion or flight 34 of the carrying path or way 28 extends parallel to and is spaced from a juxtaposed portion of the pin conveyor 4 so that can bodies 8 supported by the pins 6 are sucked at the bases thereof onto the vacuum chain 14 because of a vacuum supplied within a vacuum chamber 36 of the stripper. The vacuum is generated by a vacuum blower 38 which is suitably mounted on the exterior of stripper side wall 31. Vacuum force (suction) is exerted on the can bottoms substantially constantly through holes 42 in the chain links 44. The holes 42 are aligned with the gaps between the wear strips of the carrying way.

After the first flight 34 the carrying path or way 28 bends to a second vertical portion or flight 45. As the cans sucked against the vacuum chain traverse this second flight, they will be progressively drawn off of the pins 6 and ultimately removed from the pins of the pin conveyor 4 which is moving at the same speed as the vacuum chain 14. After removal from the pin conveyor the cans then traverse an arcuate flight in the region illustrated generally at 60. This arcuate path extends through a 90° angle to a substantially horizontal flight 62. The horizontal flight may extend to a takeaway device such as a mass conveyor 64 via dead plate 65.

Referring now to the preferred embodiment of the invention, indicated generally at 100 in FIGS. 4 and 5, it can be seen that applicant has removed the return way (26, FIG. 1) and chain guide (24, FIG. 1) that had been employed in the prior art stripper. In contrast to the prior art stripper of FIGS. 1-3, vacuum chain 114 follows or assumes a natural catenary or substantially free hanging return flight 115 from drive sprocket 118 to idler wheel 120. The free hanging return flight is further discussed below. Except for the differences herein discussed the stripper 100 according to the invention is essentially the same as the prior art stripper illustrated in FIGS. 1-3, which prior art stripper is sold by FECO Engineered Systems, Inc., of Cleveland, Ohio, under Model No. 899. Accordingly, the stripper 100 comprises the vacuum chain 114, drive sprocket 118, idler wheel 120, side walls 122 and 123, and blower 126. The side walls form therebetween a vacuum chamber 128 and the back wall of the vacuum chamber is indicated by broken line 130 in FIG. 4.

The free hanging return flight 115 is covered by a guard 131 including guard side panels 132 formed of a transparent material such as Lexan plexiglass. The side panels 132 are connected to respective stripper side walls 122, 123 at support plates 134. The guard 131 is further provided at each side with a door 136 hinged at 137 to the respective side wall. The hinged door 136 abuts a door stop 138. The front side panel 132 shown in FIG. 7 is secured to a mirror image back side panel by spacer clips 139 with the use of nuts secured to studs 140 (FIG. 9).

Both the drive sprocket 10 and the idler wheel 12 are supported between the front and back side walls 122 and 123 with a head shaft 142 and a tail shaft 143, respectively. These shafts are appropriately journaled through the front and back side walls in a conventional manner.

Representative wear strips and chain links are shown in FIGS. 6-8. The wear strips 148 preferably are of lubricant impregnated wood and the material in Arguto "K" wood wear strips has been found to be particularly advantageous. The chain or conveyor links 145 preferably are of PVC plastic. A PVC chain (No. DV-325-820-LW-SH) obtainable from Dyna-Veyor Co. of Cranford, N.J. has been found to be particularly advantageous. Although the specific material is different, the configuration of the chain is substantially the same as Rexnord 820 Series chain, in the illustrated preferred and exemplary embodiment of the invention. The links of the conveyor chain are each provided with a pair of laterally spaced apart suction holes 146.

In FIG. 7 it can be seen that a wear strip 148a has been notched at 150a to facilitate bending the wear strip around the curvilinear path it must follow at the relatively sharp bend 151 between inclined vertical flight 152 and vertical flight 153 of carrying path or way 154. These notches are about ⅛ inch deep and 1/16 inch wide and are spaced about ¼ inch apart along the length of the wear strip. For the more gradually curved flight 155 of the carrying way wear strips with similar notches spaced further apart such as by about one inch may be used. Such a strip is seen in FIG. 8 at 148b with notches 150b. Along the straight flights the strips need not be notched.

As seen in FIG. 6, the wear strips 148 are secured to outer flanges 160 of conveyor frame 162 by screws passing through holes 164 which have been appropriately countersunk. Flanges 160 are attached at the edges of the side walls 122 and 123 and form therewith the carrying way 154. As shown, the wear strips and flanges are laterally spaced apart to communicate the vacuum in vacuum chamber 128 with the suction holes 146 in the chain links which open to the top carrying surface 166 of the links.

In FIG. 6 the back portion (from the standpoint of direction of travel) of chain link 145 is shown and attachment eyes at opposite ends of the link can be seen at 170 and 172, respectively. The links are generally secured together in conventional manner by the use of typically metal pins running through the mating attachment eyes of adjacent links.

The arcuate flight 155 preferably has a radius of about 4 feet, as is the case in the prior art stripper of FIGS. 1-3. It should be kept in mind that a smaller radius coincident with an identical chain speed will increase the centripetal force exerted against the cans and may necessitate a higher vacuum pressure on the bottom of the cans to maintain their integrity on the chain, with resultant increase in chain friction and wear. In the particular embodiment illustrated in FIG. 4 the vertical elevation from the idler to the horizontal flight is approximately 130 inches and the distance between the righthand edge of the drive sprocket and an extended line of the vertical flight is approximately 84 inches.

Thus, in this improved stripper 100 the carrying way 154 is essentially the same as is contained in the prior art (FIGS. 1-3) on the front edge of the stripper, apart from the use of lubricant impregnated wear strips 148 along the carrying way 154. However, a return way, according to the invention, has been eliminated and the catenary has been significantly changed to provide the free hanging return flight 115 which has an optimum amount of sag illustrated in FIG. 4.

The return flight 115 preferably is provided with the maximum amount of sag that can be tolerated without causing "whipping" of the chain at desired operating speeds in excess of about 660 feet per minute and more particularly in excess of about 700 feet per minute up to at least about 875 feet per minute. These linear speeds of the chain typically correspond to speeds between 1500 and 2000 cans per minute. Of course the stripper may be operated at lower speeds, but satisfactory performance at the lower speeds (speeds up to about 650 feet per minute /1500 cans per minute) can be obtained using prior art strippers such as those sold by applicant's assignee, FECO Engineered Systems, Inc. of Cleveland, Ohio, under Model Nos. 810 and 899. The stripper sold under Model No. 899 is depicted in FIGS. 1-3. The above correspondence between cans per minute and feet per minute generally applies to use of the stripper in conjunction with pin conveyors having a pin spacing of about 5.25 inch.

In the illustrated embodiment there is provided about 15 inches of sag for a run or catenary length of about 138 inches, the sag being measured as the maximum distance between the return flight 115 and a line drawn tangentially to the drive sprocket and idler wheel, such distance being indicated by bracket S in FIG. 4. Such degree of sag is believed to provide optimal reduced chain tension without introducing "whipping" of the chain at the above noted high speeds. It is believed that the sag may be increased by about 1 inch or 2 inches and decreased by about 3 inches or 4 inches while still providing desired performance. Accordingly, the ratio of sag to caternary length may be selected in the range of about 0.9 inch/foot to 1.5 inch/foot, and more preferably in the range of about 1.0 inch/foot to 1.4 inch/foot.

By maintaining desired sag ratio the idler wheel 120 preferably will have a minimum wrap of 90°, i.e., the chain will engage the idler wheel over at least 90°. Similarly, the drive sprocket 118 preferably has a minimum wrap of about 90°.

By utilizing the concepts involved in this inventive design, substantial wear, heat build-up and even potential melting, i.e., material flow, in the wear area of the chain links is eliminated. The wear area of the links is at the underside surface areas which slide on the wear strips. Wear of the wear strips also is reduced.

For convenience in chain adjustment one might employ convenient chain sag indicator markers 290 and 291 on the transparent cover plates 132 to enable quick visual ascertainment of proper chain sag adjustment between preselected minimum and maximum.

It is envisioned that the optimum tension will fall within the range defined generally as optimum minumum and optimum maximum sag. The maximum tension occurs just before the point at which one would get binding of the chain or noticeably increased wear and the minimum tension would result in the greatest sag which would not exceed the point at which "whipping" would occur and tracking could not be reasonably and appropriately maintained.

Although the invention has been shown and described with respect to a certain preferred embodiment, equivalent alterations and modifications will occur to others skilled in the art upon the reading and understanding of this specification. The present invention includes all such equivalent alterations and modifications and is limited only by the scope of the following claims.

What is claimed is:

1. A stripper for removing can bodies having bases bases from a moving pin conveyor, said stripper comprising
   a drive sprocket,
   an idler,
   conveyor chain composed of articulated plastic links trained around said drive sprocket and idler, said chain having associated therewith means for causing the bases of can bodies to be held to said chain when in close proximity with respect to one another, said means for causing including a vacuum acting through said conveyer chain to releasably hold the can bodies to said chain,
   means for rotatably driving said drive sprocket to drive said chain at a speed in excess of 660 feet per minute, and
   means for guiding said chain along a carrying path from said idler to said drive sprocket, said carrying path having a first flight adapted to be disposed parallel to the path of the pin conveyor in close proximity to the bases of the can bodies, a second flight inclined to said first flight for effecting removal of the can bodies from the pin conveyor, a curved flight extending to a horizontal flight terminating at said drive sprocket, said conveyor chain having a substantially free hanging return flight extending from proximate said drive sprocket to proximate said idler, and the tension on said free hanging return flight being substantially gravitational.

2. The stripper of claim 1, wherein the free hanging return flight extends from said drive sprocket to said idler.

3. The stripper of claim 1, wherein said chain is wrapped at least 90° around said idler.

4. The stripper of claim 3, wherein said free hanging return flight defines a chain sag residing essentially entirely above said idler.

5. The stripper of claim 1, wherein said means for guiding includes lubricant impregnated wood wear strips on which said chain slides.

6. The stripper of claim 1, wherein said return flight is provided with the maximum amount of sag that can be tolerated without causing whipping of the chain at an operating speed in excess of 660 feet per minute.

7. The stripper of claim 1, wherein said return flight is provided with the maximum amount of sag that can be tolerated without causing whipping of the chain at an operating speed in excess of 700 feet per minute.

8. The stripper of claim 1, wherein said return flight is provided with sag with the ratio of sag to catenary length being in the range of about 0.9 inch per foot to 1.5 inch per foot.

9. The stripper of claim 1, wherein said return flight is provided with sag with the ratio of sag to catenary length being in the range of about 1.0 inch per foot to 1.4 inch per foot.

10. The stripper of claim 1, including guard means for covering said return flight over substantially the entire length of said return flight.

11. The stripper of claim 10, including indicator means associated with said guard means for determining proper adjustment of sag in said return flight of said chain.

12. A pin oven stripper for removing can bodies having bases from a moving pin oven conveyor, said pin over stripper comprising
    a drive sprocket,
    an idler,
    a conveyor chain composed of articulated links around said drive sprocket and idler, said chain having associated therewith means for causing the bases of can bodies to be held to said chain when in close proximity with respect to one another, said means for causing including a vacuum acting through said conveyor chain to releasably hold the can bodies to said chain,
    means for rotatably driving said drive sprocket to drive said chain at an operating speed in excess of 660 feet per minute, and
    means for guiding said chain along a carrying path from said idler to said drive sprocket, said carrying path having a first flight adapted to be disposed parallel to the path of the pin conveyor in close proximity to the bases of the can bodies, a second flight inclined to said first flight for effecting removal of the can bodies from the pin conveyor, a curved flight extending to a horizontal flight terminating at said drive sprocket, and said conveyor chain having a substantially free hanging return flight extending from proximate said drive sprocket to proximate said idler.

13. The pin oven stripper of claim 12, wherein said chain is driven at a speed in excess of 700 feet per minute.

14. The pin oven stripper of claim 12, wherein said chain is driven at a speed of at least about 875 feet per minute.

15. The pin oven stripper of claim 12, wherein said return flight is provided with the maximum amount of sag that can be tolerated without causing whipping of the chain at an operating speed in excess of 660 feet per minute.

16. The pin oven stripper of claim 12, wherein said return flight is provided with sag with the ratio of sag to catenary length being in the range of about 0.9 inch per foot to 1.5 inch per foot.

* * * * *

UNITED STATES PATENT AND TRADEMARK OFFICE
CERTIFICATE OF CORRECTION

PATENT NO. : 5,170,881

DATED : December 15, 1992

INVENTOR(S) : Beverly G. Willison

It is certified that error appears in the above-identified patent and that said Letters Patent is hereby corrected as shown below:

Column 7,

Claim 1, line 2, delete "bases".

Claim 1, line 6, before "conveyor" insert --a--.

Column 8,

Claim 12, line 7, before "around" insert --trained--.

Signed and Sealed this

Sixteenth Day of August, 1994

Attest:

BRUCE LEHMAN

Attesting Officer     Commissioner of Patents and Trademarks